No. 862,882. PATENTED AUG. 13, 1907.
C. C. COLEMAN.
TIME SPEED INDICATOR.
APPLICATION FILED NOV. 4, 1905.
2 SHEETS—SHEET 1.
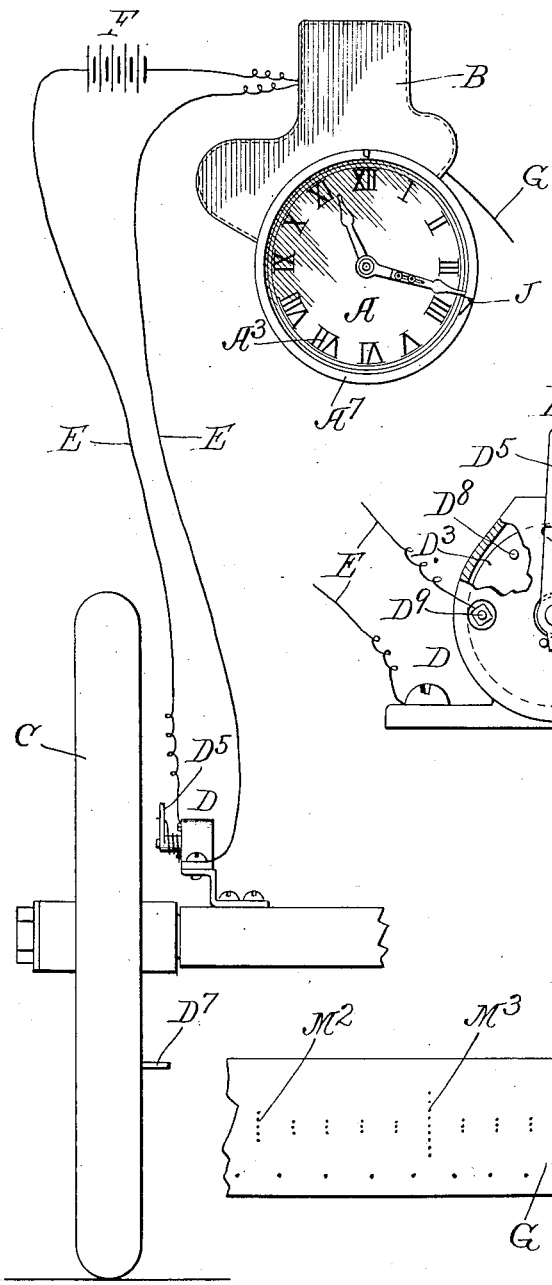
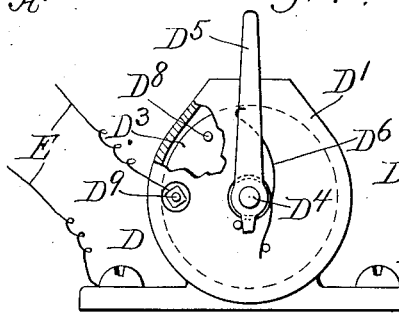
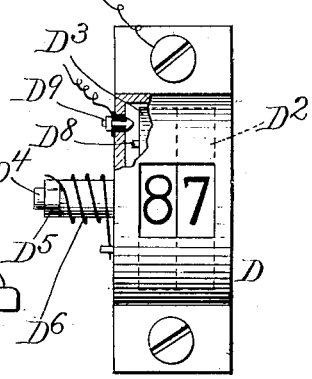
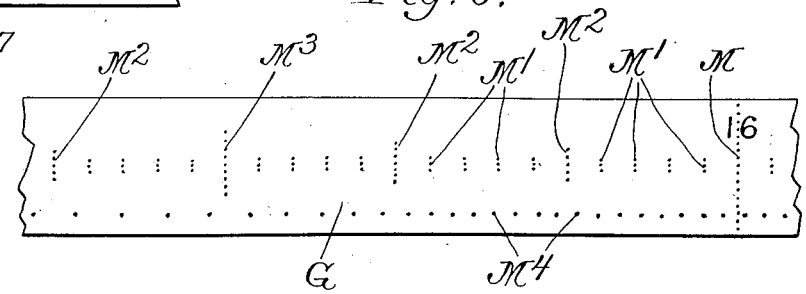
Witnesses,
Homer L. Kraft
Edward T. Wray
Inventor.
Charles C. Coleman.
by Parker Carter
Attorneys.

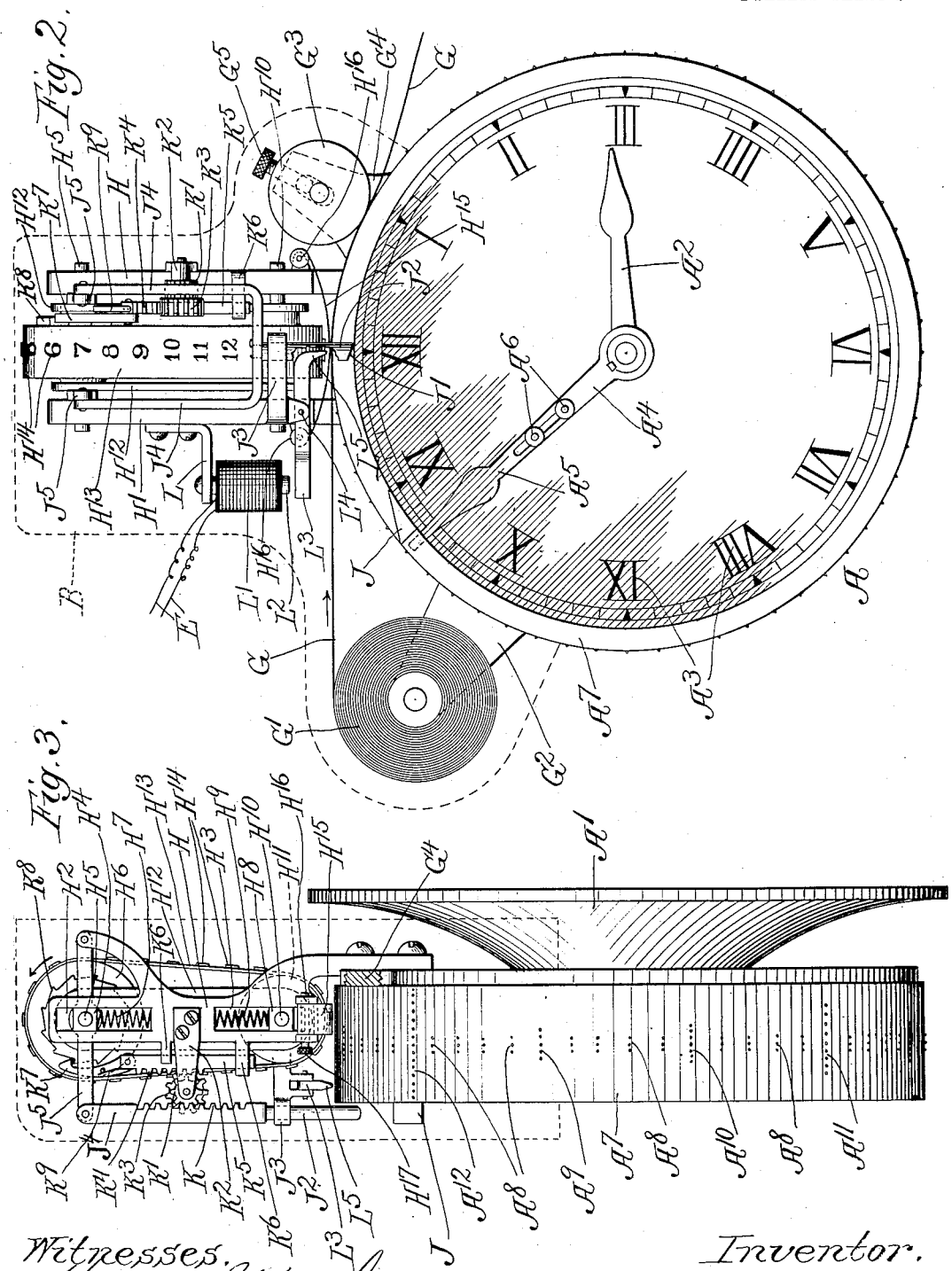

UNITED STATES PATENT OFFICE.

CHARLES C. COLEMAN, OF CHICAGO, ILLINOIS.

TIME SPEED-INDICATOR.

No. 862,882.   Specification of Letters Patent.   Patented Aug. 13, 1907.

Application filed November 4, 1905. Serial No. 285,819.

*To all whom it may concern:*

Be it known that I, CHARLES C. COLEMAN, a citizen of the United States, residing at Chicago, in the county of Cook and State of Illinois, have invented a certain new and useful Improvement in Time Speed-Indicators, of which the following is a specification.

My invention relates to devices to be used in connection with vehicles for the purpose of recording the time of a run, the distance and the speed for any particular period of time.

It has for a further object, means for making a permanent record of such computations.

The invention consists, generally speaking, of a time computing mechanism, a distance computing mechanism, said mechanisms related so as to indicate speed, in combination with recording devices for combining in permanent form such computations of time and distance in order to give a record indicating the speed of the vehicle during any period of time together with acceleration and the diminishing of speed.

The invention is particularly adapted for use in connection with automobiles and the like, but it will be obvious that it might be applied to other vehicles.

The invention is illustrated in the accompanying drawings, wherein

Figure 1 is a somewhat diagrammatic view showing the relation of the mechanism as above referred to; Fig. 2, a front view of the clock and associated recording devices; Fig. 3, a side view of the same with certain parts removed for the sake of clearness of illustration; Fig. 4, a detail of the distance computing mechanism in elevation; Fig. 5, a plan view of the same, and Fig. 6, a section of the recording tape.

Like letters of reference indicate like parts in all the figures.

Referring particularly to Fig. 1, A represents a clock, B a casing covering certain computing and recording mechanism associated with the clock and shown more particularly in Figs. 2 and 3, C a vehicle wheel, D a cyclometer provided with make and break devices and connected up by conductors E with the recording devices to be described later.

F is a battery in circuit with said conductors.

The clock A is mounted upon a base plate $A^1$ and has the hour hand $A^2$ and a minute hand, these hands being made to travel over the dial $A^3$ by the usual clock mechanism, not shown here in detail. The minute hand is made in two parts $A^4$, $A^5$, these parts being slotted and connected together by means of the set screws $A^6$. Turning loosely about the casing of the clock is an annulus $A^7$ having a perforation on its inner surface into which the outer end $A^5$ of the minute hand may be extended so that the annulus can be made to travel with the minute hand. The outer surface of the annulus is provided with projections at regular intervals in correspondence with periods of time. As shown in Fig. 3, these projections are alined in groups, the groups of three indicated by the letter $A^8$ indicating minutes, those of five, indicated by $A^9$, periods of five minutes, those of seven, shown at $A^{10}$, ten minutes intervals, and those of nine, fifteen minutes intervals, as shown at $A^{11}$. The hour I prefer to make correspond with the line of projections $A^{12}$ extending clear across the annulus.

The particular recording device which I have adapted for purposes of illustration contemplates the use of a tape of paper or other material, this tape being indicated in Fig. 2 by the letter G and shown as fed from a roll $G^1$ mounted on a bracket $G^2$ secured in any desired way to the frame of the clock. This tape passes over the annulus $A^7$ and under an idle feed roller $G^3$ mounted in brackets $G^4$, proper pressure upon the tape and the annulus $A^7$ being secured by means of the set screw $G^5$ which bears upon the axle of the feed roller.

The mechanism as above described would be sufficient to give a record of time in hours and minutes, but I prefer to make this record clearer and more easily readable by imprinting thereon figures indicating the hours of the day. The device for accomplishing this I will now describe.

Mounted on the casing of a clock are two side frames H, $H^1$ which have the longitudinal slots $H^2$, $H^3$ in respectively the upper and lower ends thereof, the slots in the part H being shown in Fig. 3. In the upper slots are bearing blocks $H^4$ in which is journaled the axle $H^5$ of a wheel $H^6$, a spring $H^7$ being interposed between the bearing block and the lower end of the slot $H^2$. In the slots $H^3$ are similar bearing blocks $H^8$ and springs $H^9$, the axle $H^{10}$ of the wheel $H^{11}$ being mounted in these blocks. The plates $H^{12}$ connect the axles with the two wheels $H^6$, $H^{11}$ so as to maintain them in constant relation. An endless tape $H^{13}$ of rubber or the like extends around the wheels and is provided with raised numerals $H^{14}$ indicating the hours of the day, preferably numbered from one to twenty-four. An inking ribbon $H^{15}$ on bobbins $H^{16}$ $H^{16}$ extends between the tape $H^{13}$ and the record tape G. The bobbins $H^{16}$ may be provided with burred wheels $H^{17}$ so that the position of the ribbon may be changed.

The printing is accomplished in the following manner: On the annulus $A^7$ is a cam J which engages a cam $J^1$ at the end of a rod $J^2$ passing through a guide bracket $J^3$ on the upright $H^1$, this rod having integral therewith a yoke $J^4$, to the arms of which are pivoted links $J^5$ through perforations in which extends the axle $H^5$ of the upper wheel $H^2$. When the cam J comes into contact with the cam $J^1$, which occurs every hour, it leaves the yoke $J^4$, tilts the lever $J^5$, raises the upper wheel and with it the lower wheel against the tension of the springs $H^7$ and $H^9$. These springs are arranged so as to normally hold the printing tape $H^{13}$ a slight distance from the annulus $A^7$. The lower spring $H^9$ being the stronger, when the cam J rides over and beyond the cam J¹, the printing apparatus, consisting of the wheels and the tape held together by the plates H¹², which has been lifted by the operation of the cams, falls suddenly and the spring H⁹ being heavier than the spring H⁷, this printing mechanism is carried below its normal position and against the annulus A⁷ or the printing ribbon and record tape when these are interposed between such annulus and the printing tape H¹⁴. This action is timed so that the hour will be printed on the line of dots formed by the hour projections H¹².

It is necessary, of course, to move the printing tape H¹⁴ one step each hour. This I accomplish through the agency of a rack K on one member of the yoke J⁴, which rack meshes with a smaller pinion K¹ mounted on a bracket K² on the frame H, this pinion being rigid with another pinion K³ so that the two pinions turn together. The larger pinion meshes with a rack K⁴ on a bar K⁵ guided at K⁶ K⁶ so as to have vertical movement upon the frame work H. Pivoted to the end of the bar K⁵ is a pawl K⁷ held in engagement with a ratchet wheel K⁸ on the wheel H⁶ by means of a flat spring K⁹. The upward travel of the yoke J⁴ will consequently cause the pawl to rotate the ratchet wheel and with it the wheel carrying the printing tape.

To compute and record the distance traveled, I make use of any ordinary cyclometer or other counting devices, furnishing the same, preferably with a device for making and breaking an electric circuit. Of course, there might be a mechanical connection between the moving part of the vehicle from which the distance of travel is taken and the recording devices, but I find the electrically actuated apparatus here shown is more convenient. I have shown an ordinary cyclometer D comprising a casing D¹ secured to a portion of the frame of the automobile and containing a units wheel D² and a tens wheel D³. It will be understood that motion is transmitted to the tens wheel from the units wheel in any desired manner. Connected with the units wheel so as to impart step by step motion thereto, is a shaft D⁴ carrying a finger D⁵ engaged by a spring D⁶ and which is rocked against the tension of this spring by a pin D⁷ on the wheel C of the vehicle. As mechanism of this sort is quite common and well understood, I have not thought it necessary to show or describe it in detail. Preferably on the tens wheel is a contact D⁸ connected with one of the wires E. A pin D⁹ projects through and is insulated from the case of the cyclometer and extends into the path of the contact D⁸ so that when the tens wheel is moved the last step to complete its revolution, the two contacts D⁸, D⁹ are brought together and separated, completing the circuits through the conductors E E.

Secured by means of the bracket L on the upright H¹ is an electro-magnet L¹ having an extended core L² to which is attracted the end of the armature L³ pivoted at L⁴ on the bracket J³. The other end of the armature forms a more or less sharp point L⁵ which makes a perforation or indentation in the paper tape as it moves along with the annulus A⁷. There will, of course, be one of these indentations or perforations made for each period of distance covered by one hundred revolutions of the vehicle wheel. By proper gearing the distance indicated by these indentations or perforations could be varied as the occasion might demand.

In Fig. 6 I have illustrated a section of the ribbon or paper tape G upon which a record of time and distance has been made. The line of dots M indicate an hour, in this case the sixteenth, that is, four o'clock in the afternoon according to the customary way of reckoning; the groups of dots M¹ the minutes, M² the five minute periods and M³ the fifteen minute periods. The dots M⁴ indicate the distance traveled and the number of these corresponding to any like interval on the time record will, of course, indicate the speed of the vehicle. Reading the example of the record here shown from right to left, it will be seen that the vehicle gradually diminished its speed from four o'clock in the afternoon until somewhat after twenty minutes past four, the period of time comprised by this portion of the record. It will be seen, therefore, that my invention provides a perfectly accurate computation and record of time and distance, these records being so related as to give a reading of the speed for any particular period of time. Moreover, this record is permanent in form so that it may come into use not only during the run of the vehicle but subsequently if need be.

I claim:

1. In a speed indicator for vehicles, the combination of a clock, a rotary device operated by the clock, to carry a record tape, a series of projections on the rotary device to perforate the tape to indicate divisions of time, a printing device located above the rotary device, means associated with the clock for operating said printing device to make printed indications of time upon the tape in correspondence with the perforations, a cyclometer, and means associated with the cyclometer for making a series of distance indications on the tape parallel with the time indications.

2. In a speed indicator for vehicles, the combination of a clock, an annular rotary device surrounding the clock to carry a record tape and propelled by the minute hand thereof, a series of projections on the rotary device to perforate the tape to indicate divisions of time, a printing device located above the rotary device, means associated with the clock for operating said printing device to make printed indications of time upon the tape in correspondence with the perforations, a cyclometer, and means associated with the cyclometer for making a series of distance indications on the tape parallel with the time indications.

3. In a speed indicator for vehicles, the combination of a clock, a rotary device operated by the clock to carry a record tape, a series of projections on the rotary device to perforate the tape to indicate divisions of time, a printing device located above the rotary device, means associated with the clock for operating said printing device to make printed indications of time upon the tape in correspondence with the perforations, a cyclometer, and connected therewith a circuit adapted to be closed thereby at intervals of distance, an electro-magnet above the rotary device in said circuit, an armature pivotally mounted and having one end thereof adapted to be brought into contact with the record tape when the circuit is closed through the magnet so as to make a series of distance indications on the record tape parallel to the time indications.

4. In a speed indicator for vehicles, the combination of a clock, a rotary device operated by the clock to carry a record tape, a series of projections on the rotary device to perforate the tape to indicate divisions of time, means for making a series of distance indications on the record tape parallel to the time indications, a printing device located above the rotary device comprising a device carrying a series of types thereon, means associated with the clock for causing said type carrying device to be brought into contact with the record tape, and means for shifting the type carrying device so as to bring the types successively into operation.

5. In a speed indicator for vehicles, the combination of a clock, a rotary device operated by the clock to carry a record tape, a series of projections on the rotary device to perforate the tape to indicate divisions of time, means for making a series of distance indications on the record tape parallel to the time indications, a printing device located above the rotary device comprising a frame work, a pair of wheels slidably mounted in the frame work, a type carrying band having types thereon extending around said wheels, means operated by the clock for bringing said printing device into contact with the record tape, and means for shifting the type carrying band so as to bring the types successively into operation.

6. In a speed indicator for vehicles, the combination of a clock, a rotary device operated by the clock to carry a record tape, a printing device located above the rotary device comprising a frame work, a pair of wheels slidably mounted in the frame work, a type carrying band having types thereon extending around said wheels, springs to normally keep said type carrying band out of contact with the record tape, a cam associated with the clock and adapted to engage with and lift the wheels and type band so that the type carrying band is brought into contact with the record tape when the wheels are released by the cam, and means for shifting said type carrying band so that the types are successively brought into operative position.

7. In a speed indicator for vehicles, the combination of a clock, a rotary device operated by the clock to carry a record tape, a printing device located above the rotary device comprising a stationary frame work, a frame work slidably mounted on the stationary frame work, a pair of wheels mounted in the movable frame work, a type carrying band surrounding the wheels and having thereon a series of types, a pair of springs interposed between the stationary and the movable frame work, the lower of said springs being the stronger, and a cam on the rotary device adapted to engage with the movable frame work and lift the same.

8. In a speed indicator for vehicles, the combination of a clock, a rotary device operated by the clock to carry a record tape, a printing device located above the rotary device comprising a stationary frame work, a frame work slidably mounted on the stationary frame work, a pair of wheels mounted in the movable frame work, a type carrying band surrounding the wheels and having thereon a series of types, a pair of springs interposed between the stationary and the movable frame work, the lower of said springs being the stronger, a cam on the rotary device adapted to engage with the movable frame work and lift the same, a ratchet on one of said wheels, a pawl engaging with said ratchet, and means operated by the upward movement of the movable frame for operating the pawl to turn said wheel and shift the type carrying band.

9. In a speed indicator for vehicles, the combination of a clock, a rotary device operated by the clock to carry a record tape, a printing device located above the rotary device comprising a stationary frame work, a frame work slidably mounted on the stationary frame work, a pair of wheels mounted in the movable frame work, a type carrying band surrounding the wheels and having thereon a series of types, a pair of springs interposed between the stationary and the movable frame work, the lower of said springs being the stronger, a cam on the rotary device adapted to engage with the movable frame work and lift the same, a ratchet on one of said wheels, a pawl to operate the ratchet, a rack on the pawl, a rack connected with the frame, and a pinion to connect the racks whereby the pawl is operated to shift the type carrying band when the movable frame work is lifted.

10. In a speed indicator for vehicles, the combination of a clock, an annular rotary device on the clock operated from the minute hand thereof and adapted to carry a record tape, a series of projections on the rotary device to make perforations in the record tape to indicate intervals of time, a cyclometer, and connected therewith a circuit adapted to be closed thereby at intervals of distance, an electro-magnet above the rotary device and in said circuit, a pivoted armature adapted to be brought into contact with the record tape when the circuit is closed through the magnet, a printing device to print hour indications corresponding to the time perforations in the tape comprising a stationary frame work, a movable frame work slidably mounted thereon, a pair of wheels mounted on the movable frame work, a type carrying band extending around said wheels, springs interposed between the movable and the stationary frame work, a cam on the rotary device adapted to lift the movable frame work, a ratchet on one of the wheels, a pawl to operate the same so as to shift the type band, and a rack device connected with the pawl and operated when the movable frame work is lifted.

CHARLES C. COLEMAN.

Witnesses:
 HOMER L. KRAFT,
 LUCY A. FALKENBERG.